May 21, 1968  H. HELM  3,384,254

LOG DRAWING APPARATUS

Filed Jan. 10, 1966  3 Sheets-Sheet 1

INVENTOR.
HUBERT HELM
BY
Woodhams, Blanchard and Flynn
ATTORNEYS

May 21, 1968  H. HELM  3,384,254
LOG DRAWING APPARATUS
Filed Jan. 10, 1966  3 Sheets-Sheet 3

INVENTOR.
HUBERT HELM
BY
Woodhams, Blanchard and Flynn
ATTORNEYS

United States Patent Office 3,384,254
Patented May 21, 1968

3,384,254
LOG DRAWING APPARATUS
Hubert Helm, Schongauerstrasse 6,
Peiting, Germany
Filed Jan. 10, 1966, Ser. No. 519,581
15 Claims. (Cl. 214—512)

ABSTRACT OF THE DISCLOSURE

A log drawing apparatus including a substantially vertical plate adapted to be connected to the hydraulic lifting and lowering suspension adjacent the rear of a tractor. The plate is provided with connections thereon for permitting attachment thereto of various lifting devices. The plate is further provided with a pair of trailing wheels positioned on opposite ends thereof with said wheels being positionable in either a raised position when transporting a load or a ground engaging position for partially relieving the weight of the load from the tractor suspension.

The invention relates to a log drawing apparatus to be mounted to tractors of normal commercial usage.

There is a log drawing apparatus of this general type already known in which a winch is provided which is releasably connectible in one condition of use to a perforated mounting bar located at the rear of the tractor and which, further, has for example such additional apparatus as a rope pulley mounted on the tractor lift arm and also has a scoop connected to hydraulic equipment of the tractor. Said apparatus makes possible transportation of timbers. For this purpose the rope is fed over the winch, which is driven by the motor of the tractor, over a gearing and over the rope pulley on the rearwardly extending lifting arm and from there the rope is led downwardly to one end of a log on the ground. After fastening of the one end of the rope around said log, for instance by means of looping, the end of the log can be lifted by operating the winch and said log then hangs freely by the rope beneath the lifting arm. After locking the rope pulley, the log, with one end elevated and the other end on the ground, can be transported by operation of the tractor. Said known apparatus can only be used for transportation of relatively light logs because the weight of the logs is positioned a substantial distance behind the rear axle of the tractor and, therefore, the front end of the tractor rises off the ground in the case where the logs are too heavy. Furthermore, during transportation of a log by the known apparatus, the lifted end hanging by the rope is swinging back and forth at the rear of the tractor as the end of the log on the ground is pulled across rough terrain and, as a result, the raised end of the log often hits the back of the tractor and damages the fenders, the rope winch and other devices. The same is true when driving down a hill because the raised end of the log swings forwardly and hits the rear end of the tractor. For these reasons, the timber transports utilizing the known log hauling apparatus is rather hard, dangerous and, for heavy logs, impossible. Transportation of a group of logs with the known apparatus is impossible.

The purpose of the invention is to produce a log drawing apparatus having a possibly universal use connectible to tractors of normal commercial usage, which is constructed simply and is reliable in operation, which can be produced economically and which is qualified for transportation of heavy logs. It is also a purpose of the invention to produce a log drawing apparatus which will not interfere with the driving safety of the operator and will not damage tractors by an uncontrolled movement of the load.

This task is solved by this invention in that the apparatus comprises a vertically arranged plate, the plane of which is transverse of the direction of movement of the tractor having hitch means for mounting said plate to the hydraulic three-point suspension of the tractor, said plate being provided with attachments, such as a rope winch, and the sides of said plate have connected thereto one wheel, each rotatable around a horizontal axis and each pivotable about a vertical axis.

In a log drawing apparatus embodying the invention, a plate is provided which is mountable to the hydraulic three-point suspension of a tractor in normal commercial use, said plate is used as the basic carrying element to which the log for transportation is affixed. The weight of the wood rests on the plate. The two wheels provided at the sides of the plate support the plate and consequently, an appreciable relief is provided to the hydraulic three-point suspension of the tractor carrying the plate. Control of the wheels is not necessary since, during the forward movement of the tractor, the wheels automatically are pulled in a moving direction. Thus, the tractor can maneuver very easily in pathless areas between trees in forest areas and when making sharp turns. The plate, as seen from the side, is positioned between the back wheels of the tractor and the wheels of the log drawing apparatus. The weight of the log to be transported hangs at the plate and, therefore, is directed downwardly between the back wheels of the tractor and the auxiliary wheels with a greater share of the load being taken by the wheels of the log drawing apparatus. The inventive log drawing apparatus can also be used to transport very heavy log loads. When a very heavy load is hauled, the tractor's front end is not lifted from the ground. By means of a sensitive control of the hydraulics of the three-point suspension, the driver of the tractor is in the position to raise or lower the plate thus counterbalancing the back wheels of the tractor and the apparatus' wheels and to adjust same to the weight of the load of the log and the conditions of the area. Thus, a high level of driving certainty is achieved by the log drawing apparatus of the invention. According to the invention, attachments which can be affixed to the plate are used for lifting the log to be transported and for mounting the loads of the log on the plate. Depending on the condition of the log to be transported, differently constructed attachments can be used, some of which are described hereinafter. To transport very long logs, a rope winch can be used as an attachment which is affixed at the upper edge of the plate or at the side of the plate between the plate and the tractor, whereby a guide pulley is provided at the upper edge of the plate for guiding the rope coming from the winch. The rope is looped around the end of a log or around the ends of several logs. Thus the log or group of logs is then lifted at one end and is left hanging between the apparatus' wheels. The logs can be transported by the tractor in this position. The other end of the logs is left to slide along the ground. The plate during movement of the logs is not only used as the basic carrying element for the load but at the same time, is used as a protection wall for the rear end of the tractor. The plate takes the many hits occurring from the lifted ends. When driving down a hill, the plate advantageously keeps the logs from sliding forwardly because of their own weight into the rear end of the tractor and prevents damage to the tractor. Therefore, the worry of damage to the tractor is completely eliminated and the safety of the tractor driver is guaranteed. The inventive log drawing apparatus consists of a few parts and can be manufactured economically. It is constructed simply and sturdily and, therefore, very reliable in operation.

A very advantageous embodiment of the log drawing apparatus, according to the invention, is constructed in such a way that the wheels can be elevated and locked in the raised position on the opposite side of the tractor. Thus, it is possible to drive backwards with the tractor when the wheels are elevated and to bring the plate exactly to the desired place, for instance, at the end of the log which has to be lifted. The wheels are then put back on the ground and are connected to the plate, so that vertical forces can be transferred from the plate to the wheels. A further advantage of the elevation adjustment of the wheels is that when the wheels are lifted, the plate can be hydraulically lowered for instance, to the ground. The plate can then be used as a scraper blade for leveling the ground. Furthermore, attachments can be attached to the plate and can be loaded with logs when they are placed on the ground. Attachments of this kind are further described hereinafter.

An essentially easy handling of the log drawing apparatus is accomplished inventively by arranging each wheel in a holder, which is swingably mounted about a horizontal axis and which is releasably mounted to the plate. During loading of the log drawing apparatus, it is therefore possible to swing the wheels upwardly about the horizontal axis of its holders. Consequently, the plate with the respective attachment can be lowered to the ground and can be loaded. After the lifting of the loaded apparatus the wheels can be let down to the ground again and their holders can be fixed to the plate when the wheels touch the ground. Said fixing of the swingable holders can occur, for instance, by the help of a bolt. Deviation of the wheels is possible by a few manipulations within a short period of time. If the wheels should not be extended to the ground they can be fixed in the elevated position at the plate, for instance, by means of chaining.

A favorable constructive formation of the log drawing apparatus is given by means of the mounting for the attachments being constructed as holes acting together with through-bolts or screws; said holes are arranged in the plate or in suitable reinforcement bars for said plate. Such a mounting is simple and guarantees a rapid mounting and removing and a reliable fastening of the attachments.

A very advantageous construction of the log drawing apparatus is achieved by means of a horizontal extension of the lower edge of the plate. This way the plate, when lowered to the ground, can be used as a leveling plate. It is then possible, for instance, to smooth areas of extreme roughness on uneven forest paths, before or during transportation of the log, to make the towing away of the logs easier.

One especially favorable construction of the log drawing apparatus for transportation of stacked wood and logs is given by an additional apparatus constructed as a three-legged frame carrying a guide pulley, whereby two legs of the frame at their lower ends are releasably attachable to the upper edge of the plate and the third leg at its lower end is releasably attachable to either the face of the plate facing the tractor or at the rear end of the tractor above the three-point suspension. Said frame including a guide pulley acts together with a rope winch. The rope winch can either be attached to the side of the plate facing the tractor, or to the rear end of the tractor, whereby the guide pulley at the frame is used for guiding the rope coming from the rope winch. The guide pulley is positioned relatively high above the upper edge of the plate.

Therefore, a lot of space is underneath the pulley so that relatively large numbers of logs positioned parallel with the plate can be lifted up so that the freedom of movement of the wheels is not disturbed. Also, logs having a diameter approximately equal to the height of the plate can be lifted so that easy towing can be achieved. The frame of the guide pulley can also be used in connection with a rope winch which is arranged at the rear end of the tractor and not at the plate.

A very advantageous construction of the log drawing apparatus, according to the invention, is that an additional apparatus is provided which is constructed as a support releasably mounted onto the plate, extending rearwardly therefrom; positioned horizontally, limited by rods at the ends of the support and lowerable to the ground. Transportation of the logs takes place in a way that the support is lowered to the ground and the support is pushed by the tractor beneath one end of the log. The end of the log lying on the support is then lifted so that only one end of the log lies on the ground. The end of the log resting on the support can be fastened to the plate or support by means of rops or chains in a way that the log can be pulled along when the tractor drives forwardly and will not make any uncontrolled relative movement with respect to the tractor. A lateral back and forth rolling of the log on the support is prevented both by the fastening ropes or chains, and by the rods at the sides of the support. Thus, damage to the rear end of the tractor when logs are being transported is completely impossible, because the motion of the log is not only limited by the rods but also limited in its lateral movement by the plate in case of a forward movement of the log when driving down a hill.

The above-described log drawing apparatus having a support is advantageously constructed, in a way that the support is a horizontally extending cross member connected to the plate by uprights; said cross member being used for placing the ends of the logs thereon. The cross member is shorter than the width of the plate and is arranged between the wheels. Said construction has the advantage that a log can be loaded in a way that its one end does not directly lie on the cross member but projects over same in the direction of the plate, and that the log lies on the cross member rearwardly of one end. Because of the space between the cross member and the plate, the end of the log projecting over the cross member to the plate can be reached from all sides, so that a rope or a chain can be looped around the one end.

To provide practical mounting of the cross member to the plate, the two ends of the cross member are connected rigidly or releasably to the plate by means of a pair of rigid rods, each extending transversely upwardly to the upper edge of the plate and by means of another pair of rigid rods extending to the lower edge of the plate. The transversely upwardly extending rods fulfill two other purposes; a carrier for directing the reaction on support from the cross member onto the plate and they provide a lateral limitation of the back and forth rolling of the log lying on the cross member. They can also be used as pushing bars to roll logs which lie at the ground transverse of the lengthwise axis of the tractor. To roll logs, the plate with the cross member thereon is completely lowered to the ground and a backward movement of the tractor will bring the cross member to the middle of the log at the periphery of the log. The transversely upwardly extending rods will cause the log to roll. The lower rigid rods extending horizontally to the lower edge of the plate are constructed as compression members and serve as carriers for the cross member during lifting and carrying of logs and as support members for transferring pressure from the cross member to the plate during the rolling of logs lying on the ground.

An especially advantageous construction of the log drawing apparatus is also accomplished by means of the cross member which is of a ramplike cross-sectional shape. A cross member of such a cross section can easily be pushed underneath the end of a log lying on the ground by means of a backward movement of the tractor. The upper edge of the ramp facing the plate can be of a sharp-edged construction so that same acts as a barb to prevent the logs from sliding off the cross member when they are being hauled.

Another favorable construction of the log drawing apparatus is accomplished by providing at each end of the cross member a stop to limit the turning range of the wheels. When driving over very rough ground, for instance, over roots in forest areas, it can happen that the wheels will turn about their vertical center of rotation. To prevent the striking of a wheel on the end of the cross member and to prevent damage to the wheel or the cross member, it is desirable to provide a strip of rubber at each end of the cross member.

An especially universal construction of the log drawing apparatus according to the invention is given by a stacked wood carrying device which is releasably mountable to the plate and the support. The stacked wood carrying device consists of a carrying apparatus having a horizontal carrying surface, said carrying apparatus extending past the support horizontally rearwardly so that same can be set down on the ground. Said carrying device consists of at least one releasably mountable rack member which extends upwardly at the free end of the carrying apparatus and which prevents a downward rolling of logs which are place transverse to the lengthwise axis of the tractor. By means of said stacked wood carrying device many stacks of stacked wood, for instance, stacks of thin rods or stacks of branches can be picked up and transported together. To load the carrying device the carrying surface of the carrying device is lowered to the ground and is pushed under the stack of wood for transportation by a backwards movement of the tractor. It is necessary that a small space is provided between the bottom surface of the stack of wood and the ground. This, however, is almost always the case since usually such stacks are erected on some spaced blocks of wood which are arranged transversely with respect to the lengthwise direction of the stack. After going underneath the stack, the rear ends of the horizontal carrying surface project from the stack on the opposite side. At said projecting ends, the rack members can now be mounted. Said rack members, for instance, can be constructed as posts which stand vertically upwardly from the ends of the horizontal carrying surface; the surface of the log stack opposite the tractor lies against said posts. After mounting the posts, the stacked wood carrying device can be lifted from the ground and the stack as a whole can be transported. As a constructive addition to the carrying apparatus, it is very practical to provide beams at the end of the horizontal carrying surface which project frontwardly upwardly from the horizontal carrying surface to prevent the load of stacked logs from falling on the rear end of the tractor.

Another added feature of the log drawing apparatus is providing at the lower edge of the plate at least one brake tooth projecting vertically downwardly to the ground and releasably connectible to the plate, as by screwing. Such brake teeth can dig into the ground as a drag while the tractor drives down the hill on slippery and soft ground carrying heavy loads. By this the tractor can be prevented from sliding and the driving safety is thereby improved.

Further characteristics of the invention are shown in the following description of several examples of constructions in connection with the drawing.

Figure 1:
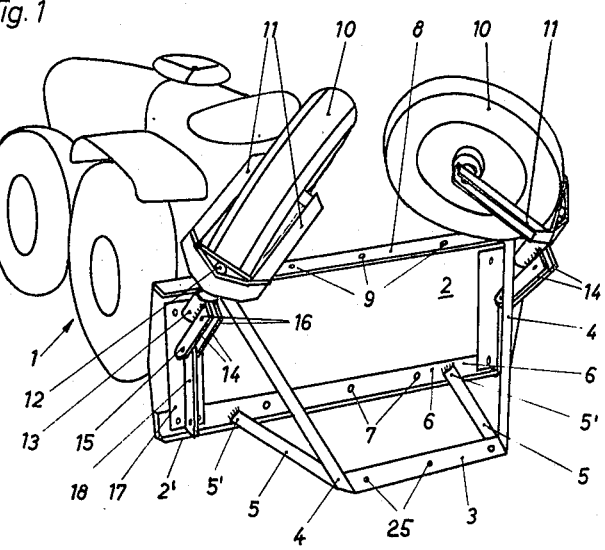
FIGURE 1 is a perspective view of a log drawing apparatus of the invention with an additional apparatus which is constructed as a horizontal support, whereby the log drawing apparatus is drawn in its use with a tractor of normal commercial use and in its position depressed to the ground with lifted wheels.
Figure 2:
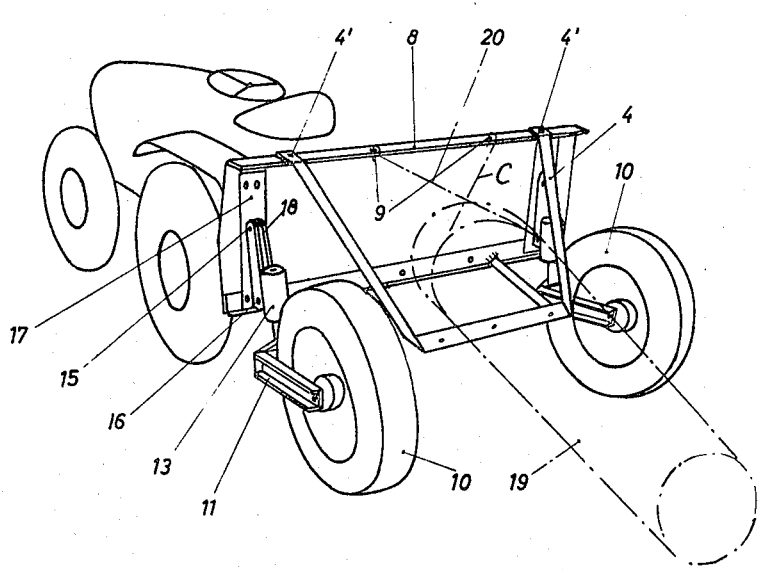
FIGURE 2 is a perspective view of the same log drawing in lifted position, the wheels swinging downwardly.

FIGURE 1 shows a tractor in normal commercial use, generally referred to by the numeral 1 having at the rear end a sheet-metal plate 2 which is connectible to the vertically moveable hydraulically three-point suspension (not shown) on the tractor. The lower edge 2' of the plate 2 extends horizontally and can be used as a scraper blade for leveling uneven areas. A horizontally aligned cross member 3 extends parallel to the plate 2 and is spaced from the side of the plate 2 opposite the tractor. Rods 4 are welded to both ends of the cross member 3 and extend transversely upwardly. The free end of each rod 4 is provided with a horizontal planar shackle 4' having a hole therethrough. A rod 5 is also welded to both ends of said cross member 3 and extends essentially horizontally inwardly toward said plate 2. The other ends 5' of the rods 5 are welded to a vertical face of an L-shaped angle iron 6 which extends parallel to the cross member 3. The other horizontal face of the L-shaped angle iron 6 extends rearwardly under the ends 5' of the rods 5. The vertical face of the L-shaped angle iron 6 has several holes 7 therein. A second L-shaped angle iron has its vertical face welded to the upper edge of the plate 2. The horizontally directed face 8 of the L-shaped member projects rearwardly and has several holes 9 therein. The shackles 4' at the free end of the rods 4 can be placed on the horizontal face 8 of the L-shaped angle on the upper edge of the plate 2. Two of the holes 9 in the horizontal face 8 are arranged so that they can be brought into alignment with the holes in the shackles 4'. It is possible, therefore, to connect the rods 4 and the shackles 4' to the horizontal face 8 of the L-shaped member on the plate 2. The L-shaped member 6, to which the horizontally extending rods 5 are welded, can be connected to the wall of the plate 2 a little above the lower edge 2' of the plate 2. The plate 2, in this area, is provided with holes which then come into alignment with the holes 7 in the vertical face of the L-shaped member 6. Consequently, the L-shaped member 6 can be connected to the plate 2. Thus, it is possible to easily and quickly connect and disconnect the cross member 3 to the plate 2. The cross member 3 is constructed as a strap iron which is mounted relatively to the rods 4 and 5 so that during the lowering of the plate towards the ground, the edge of the strap iron facing away from the plate first touches the ground. The edge of the strap iron which faces the plate 2 is positioned a little higher thereby so that it does not touch the ground. Also, the lower edge 2' of the plate 2 does not quite touch the ground. The cross member 3 thus forms a longitudinally inclined ramp, which can easily be pushed underneath the end of the trunk lying on the ground by means of a backwards movement of the tractor. The cross member 3 can also be constructed as an angle section. The edge of the cross member 3 facing the plate 2 is pressed deep into a log lying on said edge so that the log will not slide off the cross member 3 during a forward movement of the tractor. The length of the cross member 3 is shorter than the width of the plate 2 so that at each of the two ends of the cross member 3 trailer wheels 10 can be arranged. Each trailer wheel 10 is mounted rotatably in a fork 11. To the fork base of each fork 11 a pin 12 is welded, which extends perpendicularly to a theoretical plane through the fork shanks and which is positioned rotatably in a sleeve 13 but held against lengthwise movement therein. Two parallel shackle plates 14 are welded to the outer periphery of each sleeve 13 parallel to the axis of the sleeve. Each pair of shackle plates 14 is spaced from the other and has two pairs of aligned bores 15 and 16. One fitting 17 is secured to both side edges of the plate 2 opposite the tractor. Each fitting 17 is provided with a flange 18 projecting freely to the rear. One pair of shackles 14 of a wheel holder can be slipped over each flange 18. The flanges 18 are provided with bores 15 or 16 aligned with similar holes in the shackles 14. By means of a bolt pinned through the holes 15 into the shackle 14 and through the corresponding holes in the flange 18, the wheel-holder can be pivotally connected with the plate 2, the bolt being used as the horizontal pivotal axis for the wheel-holder. FIGURE 1 shows the wheels 10 in their elevated position, whereas FIGURE 2 shows the wheels in their lowered position touching the ground. To connect the wheel-holders of the wheel 10 rigidly to the plate 2 and to permit the wheels 10 to carry a load, it is only necessary to pin a second bolt through the hole 16 and through the corresponding aligned hole in the flange 18. Then the wheel-holder is no longer pivotal around the bolt through the hole 15, but is rigidly fastened to the plate 2. With the wheel-holder fastened in this way to the plate, the wheels 10 can be pivoted only about the center axis of the sleeve 13. The sleeves 13 are vertically positioned in the locked position of the wheel-holder. The wheels 10 control themselves in the direction of the movement of the tractor.

The use of the inventive log drawing apparatus for transportation of logs is shown in FIGURES 1 and 2. To load the cross member 3 with a log lying on the ground, the plate 2 is lowerd to the ground by means of the hydraulic three-point suspension, until the cross member 3 lies on the ground. The wheels 10 are at this moment in lifted condition. A backwards movement of the tractor will cause the cross member 3 to be pushed underneath the end of the log. After this, the plate 2 and the cross member 3 are lifted hydraulically. A transverse movement of the log 19 (FIGURE 2) from the cross member 3 is prevented by the transversely upwardly extending rods 4. Around the end of the log 19, which is lying on the cross member 3, a chain or rope C can be looped, the ends of which are fastened by hooks through the holes 9 at the plate 2. The rope C transfers part of the drawing force of the tractor to the log whereas another part of the drawing force is transferred from the tractor by friction between the log 19 and the cross member 3. If the trunks are especially heavy, the wheels 10 are swung downwardly after the cross member 3 is lifted. The holders of the wheels 10 are locked at the plate by means of bolts which are pinned into the holes 16 through the shackles 14 and which are brought into alignment with the holes in the flanges 18 fastened to the plate. The wheels 10 transfer the load of the log 19 acting on the plate 2 directly to the ground and thus releave the hydraulic three-point suspension of the tractor. For small and light logs, the wheels 10 can remain in their elevated position.

Figure 3:
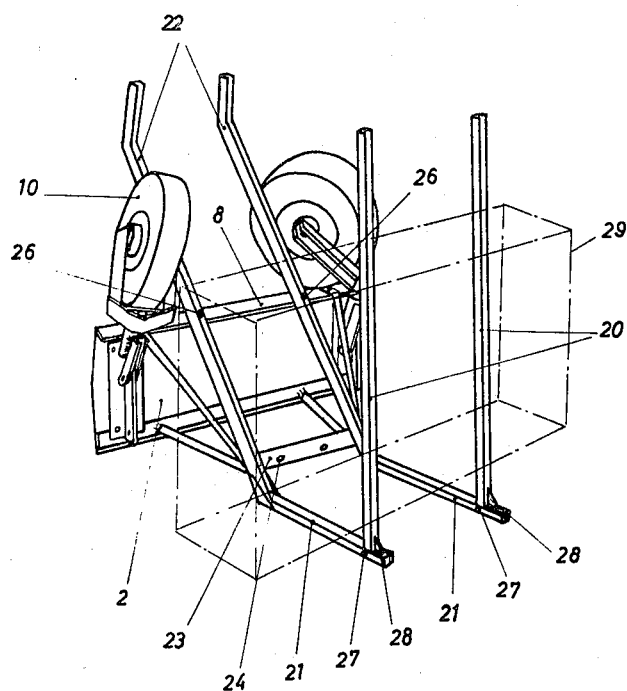
FIGURE 3 is a perspective view of a log drawing apparatus with a stacked wood carrying device to transport stacks of logs into the position depressed to the ground.

FIGURE 3 shows the inventive log drawing apparatus having a carrying device for the transportation of a stack of logs. The carrying device comprises a carrying apparatus which can be fastened to the cross member 3 and to the horizontal face 8 of the upper edge of the plate 2 and which consists of two vertical posts 20. The carrying apparatus is constructed as a frame which consists of welded U-shaped member and the carrying apparatus comprises two horizontally extending support arms 21 and two beams 22. Each support arm 21, at one end, is welded to one end of a flange 22 and form an obtuse angle therewith. The two parts of the frame, which each consist of one support arm 21 and one flange 22, are arranged parallel to each other and are welded together by means of a coupling plate 23. Consequently, the coupling plate is welded between the flange 22 so that same can be brought to an abutment at the transversely extending flat iron of the cross member 3. The coupling plate 23 is provided with holes 24 which can be brought into an alignment with holes 25 in the cross member 3. The coupling plate 23 can be connected to the cross member 3 by screws or bolts. After the coupling plate 23 is fastened to the cross member 3, the flanges 22, which extend transversely upwardly are lying on the horizontal face 8 at the upper edge of the plate 2. The flanges 22, in this area, are provided with holes 26 which can be brought into alignment with the holes 9 in the horizontal face 8. The flanges 22 can be fastened to the horizontal face 8 of the plate 2 by means of bolts or screws. After the carrying apparatus is fastened to the cross member 3 and to the plate 2, the support arms 21 project rearwardly, essentially horizontally and parallel to each other. The support arms 21 are mounted to the cross member 3 so that they come to rest on the ground first during the lowering of the plate 2. The support arms 21 are constructed as opened U-shaped members which are opened in an upward direction. At the free ends of the support arms 21, the U-shaped members are provided with horizontally aligned holes 27. The lower ends of the posts 20 are provided with holes, which can be brought into alignment with the holes 27 in the faces of the U-shaped member. By means of plug pins, which are pinned through the holes 27 and through the holes at the lower ends of the posts 20, the posts 20 can be fastened to the free ends of the support arms 21. A tipping to the rear of the posts 20 is prevented by means of projections 28 which are attached to the free end of the support arms 21.

To load the carrying device, the posts are taken off from the free ends of the support arms 21 and the plate 2 is lowered so that the support arms 21 rest on the ground. By a backward movement of the tractor to a stack of wood, which is positioned perpendicular to the parallel support arms 21, the support arms 21 are pushed underneath said stack. It is presumed, of course, that the stack 29 rests on spaced blocks of wood so that a space is provided between the underside of the stack and the ground. If the tractor moves back far enough, the free ends of the support arms 21 would project out on the opposite side of the stack. Then the posts 20 can be placed into the free ends of the support arms 21 and by means of bolts through holes 27 through the faces of the U-shaped member of the support arm 21 and through the corresponding holes in the lower ends of the posts 20, the posts 20 can be fastened to the support arms 21. The purpose of the posts 20 is to prevent a falling of the stack 29 to the rear. The purpose of the beams 22 is to prevent a forward falling of the stack 29 and to ensure that none of the stacked wood falls onto the rear of the tractor. After lifting the plate 2 and, consequently, lifting the stack 29 from the ground, the wheels 10 can be swung downwardly and can be locked to the plate 2 so that they carry the load and not the three-point suspension. The stack 29 can be fastened to the carrying device by ropes in a way that it does not fall off during transportation. At the destination point, the stacked wood can then be unloaded in its original shape by lowering the plate.

The plate 2, above the lower edge 2', is provided with holes to which brake teeth extending vertically downwardly can be attached. Furthermore, a metal box, not shown in the figures, is provided at the side of the plate 2 facing the tractor, in which chains and ropes to fasten the loads on the log drawing apparatus can be kept. Furthermore, holes are provided in the plate 2, which can be used, if desired, for fastening of an additional rope winch at the plate 2.

Figure 4:
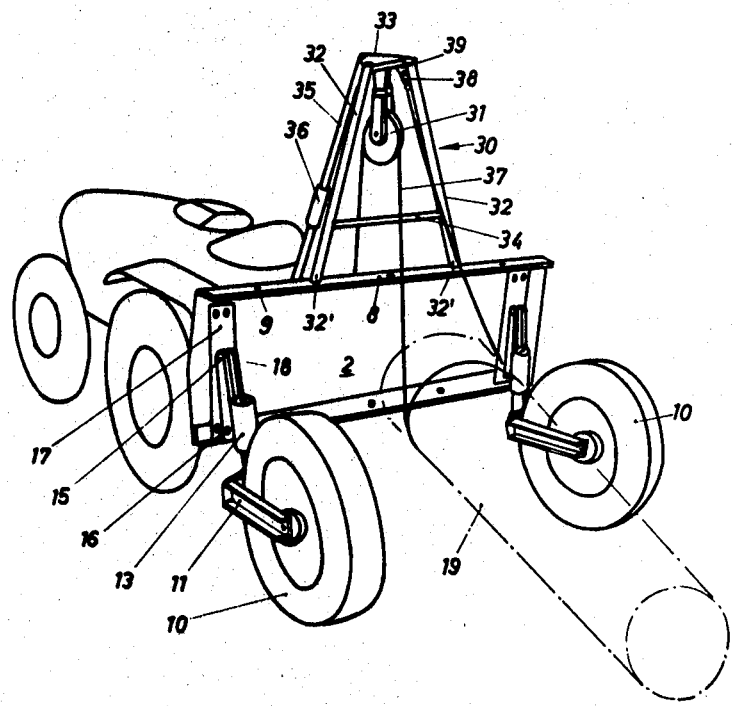
FIGURE 4 is a perspective view of a log drawing apparatus with an additional apparatus which is constructed as a frame with a guide pulley.

FIGURE 4 shows a log drawing apparatus with an additional apparatus, and comprises a three-legged frame 30 to which a guide pulley 31 is rotatably mounted. Inasmuch as the parts of the log drawing apparatus are the same as those described in FIGURES 1–3, the same reference numerals have been used in FIGURE 4 and will not hereinafter be discussed. Two legs 32 of the frame 30 are mounted with their lower ends 32' fastened to the upper edge of the plate 2. The lower ends 32' of the legs 32 for instance are provided with stud screws, the studs are inserted through holes 9 in the face 8 and are secured thereto by nuts. Swinging of the legs 32 is guaranteed by the pins which are slack in the bores 9. For instance, it is also possible to provide bored shackles at the lower ends 32' of the legs 32; said shackles can rest swingably by means of bolts in (not shown) fork shackles mounted to the upper edge of the plate 2. The upper ends of the legs 32 are fixed to a plate 33, for instance, by bolts, or welding. For reinforcement, the legs 32 are connected by a cross bar 34. A third leg 35 of the frame 30 is mounted flexibly with its upper end fastened to the plate 33. The lower end 35 is mounted flexibly to a housing (not shown) of a rope winch; said rope winch is fastened to the side of the plate 2 between the tractor and the plate. The leg 35 comprises two parts, which are connected by means of a turn buckle 36 having two oppositely directed threads. By turning the turn buckle, the length of the legs 35 can be changed and can be adjusted to the desired requirements. The guide pulley 31 is suspended from the bottom surface of the plate 33, in a way that it is pivotal about a vertical axis and is rotatable about a horizontal axis. A rope 37 extends from the rope winch over the guide pulley 31 to the load which is to be winched.

For transportation of timber the rope 37 is looped around the end of a log 19 or around several parallel logs. The free end of the rope is provided with a hook 38 which can be hung into an ear 39 at the plate 33. After this the rope 37 is pulled toward the rope winch over the guide pulley 31 so that the fastened end of the log 19 is lifted sufficiently. The guide pulley 31, because of its suspension, adjusts its direction to the direction of motion of the traction rope 37. As soon as the log 19 is lifted, same can be drawn and transported by means of a forward movement of the tractor.

For transportation of stacked wood, the rope 37 running rearwardly from the guide pulley is looped around a stack of aligned logs. After this, the whole stack of wood is lifted by the rope winch until the wood hangs over the wheels so that the movement of the wheels is not disturbed.

After lifting both timber and stacked wood, it can still be fastened to the plate 2 by means of additional ropes or chains to prevent a back and forth swinging of the wood during transportation.

The invention is not restricted to the embodiment illustrated. For instance, a rope winch can be mounted to the upper edge of the plate. It is also possible to fasten the cross member 3 not by means of rigid rods to the plate 2 but by means of metal sheets which extend vertically.

All characteristics resulting from the description and the drawing, including the constructive details can also be inventive in any desired combination contemplated by the claims.

The embodiments of the invention in which an exclusive property or privilege is claimed are defined as follows:

1. A log drawing apparatus adapted for connection to a tractor or a similar vehicle having a hydraulic three-point suspension, said apparatus comprising:
   a substantially vertical plate positioned substantially transversely with respect to the direction of travel of said tractor, said plate extending substantially across the rear of said tractor;
   first connection means on said plate for permitting said plate to be mounted on the hdyraulic lifting and lowering three-point suspension of said tractor;
   second connection means being provided on said plate for permitting the securing of attachments thereto;
   a pair of trailing wheels positioned on the side of said plate opposite the tractor with said wheels being positioned adjacent opposite edges of said plate; and
   mounting means interconnecting each of said wheels to said plate for permitting pivotal movement of the wheel relative to said plate about a substantially vertical axis located forwardly of the rotational axis of said wheel whereby each wheel can freely adjust to the direction of travel, said mounting means also permitting pivotal movement of each of said wheels about a substantially horizontal axis so that the wheels can be carried either in an elevated position when transporting a load or lowered to a ground engaging position when transporting a load for partially relieving the three-point suspension of said load.

2. A log drawing apparatus as defined in claim 1, wherein:
   said mounting means permits the wheels to be elevationally adjusted and releasably attached to said plate.

3. A log drawing apparatus as defined in claim 1, wherein:
   said mounting means includes a holder which is releasably attached to said plate and is pivotable about a substantially horizontal axis with respect to said plate.

4. A log drawing apparatus as defined in claim 1, wherein:
   said second connection means is constructed as holes cooperating with threaded fastening members for fixedly securing attachments to said plate.

5. A log drawing apparatus as defined in claim 1, wherein:
   the lower edge of said plate is substantially horizontal.

6. A log drawing apparatus as defined in claim 1, further including:
   frame means mounted on said plate, said frame means comprising a three-legged frame having two legs thereof secured at their lower ends to the upper edge of said plate, the third leg having its lower end secured to a side of the plate;
   an attachment comprising a rope winch mounted on said plate and having a rope extending from the winch over the guide pulley and extending to the load.

7. A log drawing apparatus as defined in claim 1, further including:
   support means fixedly secured to said plate and extending rearwardly thereof in a substantial horizontal direction, said support means being movable to a lowered position adjacent the ground when the plate is similarly moved.

8. A log drawing apparatus as defined in claim 7 wherein:
   said support means comprises a cross member spaced from and substantially parallel to said plate, and frame elements interconnecting said cross member to said plate, said cross member being adapted for supporting the ends of timbers thereon, said cross member being shorter than the width of said plate and being positioned between the pair of trailing wheels.

9. A log drawing apparatus as defined in claim 8, wherein:
   the frame elements include a rigid rod extending angularly upwardly from each end of said member to the upper edge of said plate for releasably connecting said cross member to said plate, said frame elements also including a further rigid rod extending substantially horizontally from each end of said cross member to the lower edge of said plate for interconnecting said cross member to said plate.

10. A log drawing apparatus as defined in claim 8, wherein:
    the cross member has a ramp-like cross section.

11. A log drawing apparatus as defined in claim 8, further including:
    stop means mounted on each end of said cross member for limiting the pivotal movement of said wheels about the vertical axis.

12. A log drawing apparatus as defined in claim 8, further including:
    carrying means interconnected to the plate for supporting a load thereon, said carrying means being constructed as a carrying frame having a substantially horizontal surface projecting rearwardly of the cross member and being positionable on the ground.

13. A log drawing apparatus as defined in claim 12, wherein:
said carrying frame includes two support arms fixed relative to the plate and extending rearwardly of the tractor, and two beams extending upwardly from the ends of said support arms adjacent the cross member obliquely over the upper edge of said plate.

14. A log drawing apparatus as defined in claim 13, wherein:
posts are releasably connectible to the free end of each support arm with said posts projecting vertically upwardly.

15. A log drawing apparatus as defined in claim 1, further including:
brake means releasably connected to the lower edge of said plate and extending vertically downwardly therefrom toward the ground, said brake means comprising a plurality of brake teeth adapted to dig into the ground so as to create a drag on the tractor.

References Cited

UNITED STATES PATENTS

| 2,471,152 | 5/1949 | Griffin. |
| 2,554,900 | 5/1951 | Davies. |
| 2,736,442 | 2/1956 | Westholt. |
| 3,111,174 | 11/1963 | Fry et al. |

FOREIGN PATENTS

| 479,430 | 3/1953 | Italy. |

GERALD M. FORLENZA, *Primary Examiner.*

ALBERT J. MAKAY, *Examiner.*